Figure 1:
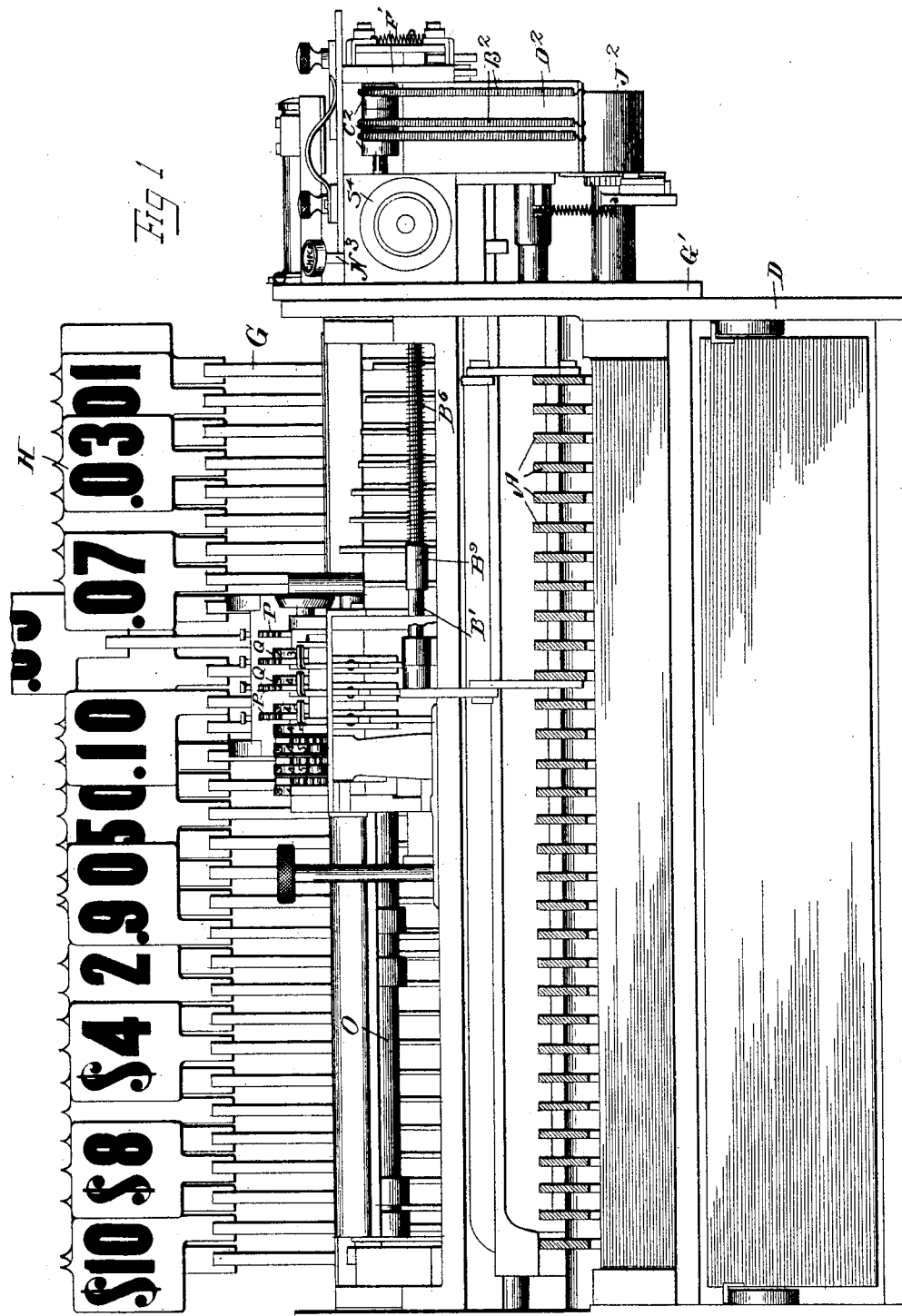

(No Model.)  6 Sheets—Sheet 1.

T. CARNEY.
CASH REGISTER AND RECORDER.

No. 588,127.  Patented Aug. 17, 1897.

Witnesses.
Martin H. Olsen
Leonora Wiseman

Inventor
Thomas Carney
By James Rector Atty (No Model.) 6 Sheets—Sheet 3.

T. CARNEY.
CASH REGISTER AND RECORDER.

No. 588,127. Patented Aug. 17, 1897.

Witnesses.
Martin H Olsen
Lemma Huseman

Inventor
Thomas Carney
By Edward Rector Atty (No Model.) 6 Sheets—Sheet 4.
T. CARNEY.
CASH REGISTER AND RECORDER.
No. 588,127. Patented Aug. 17, 1897.
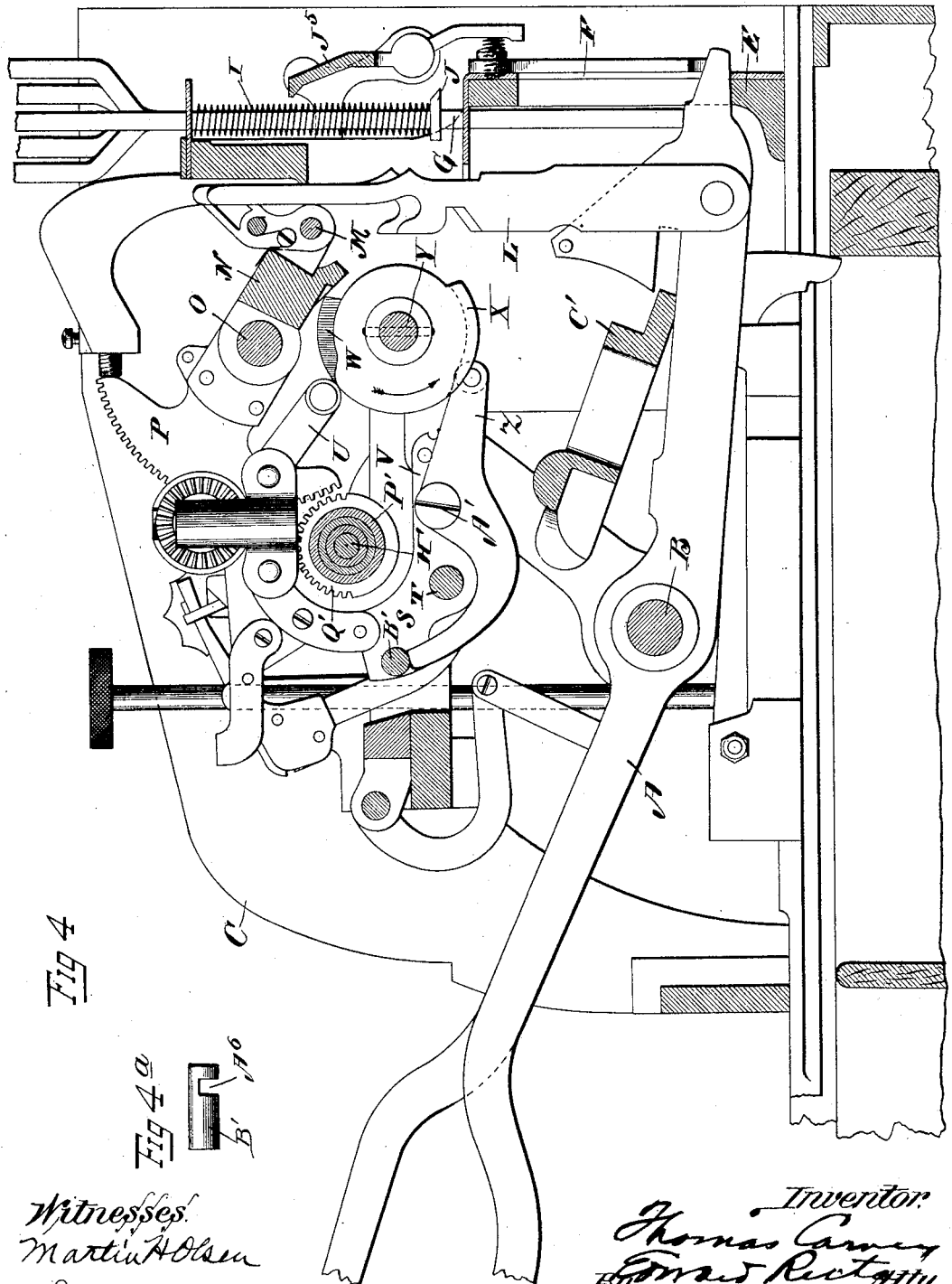

(No Model.) 6 Sheets—Sheet 5.
T. CARNEY.
CASH REGISTER AND RECORDER.
No. 588,127. Patented Aug. 17, 1897.
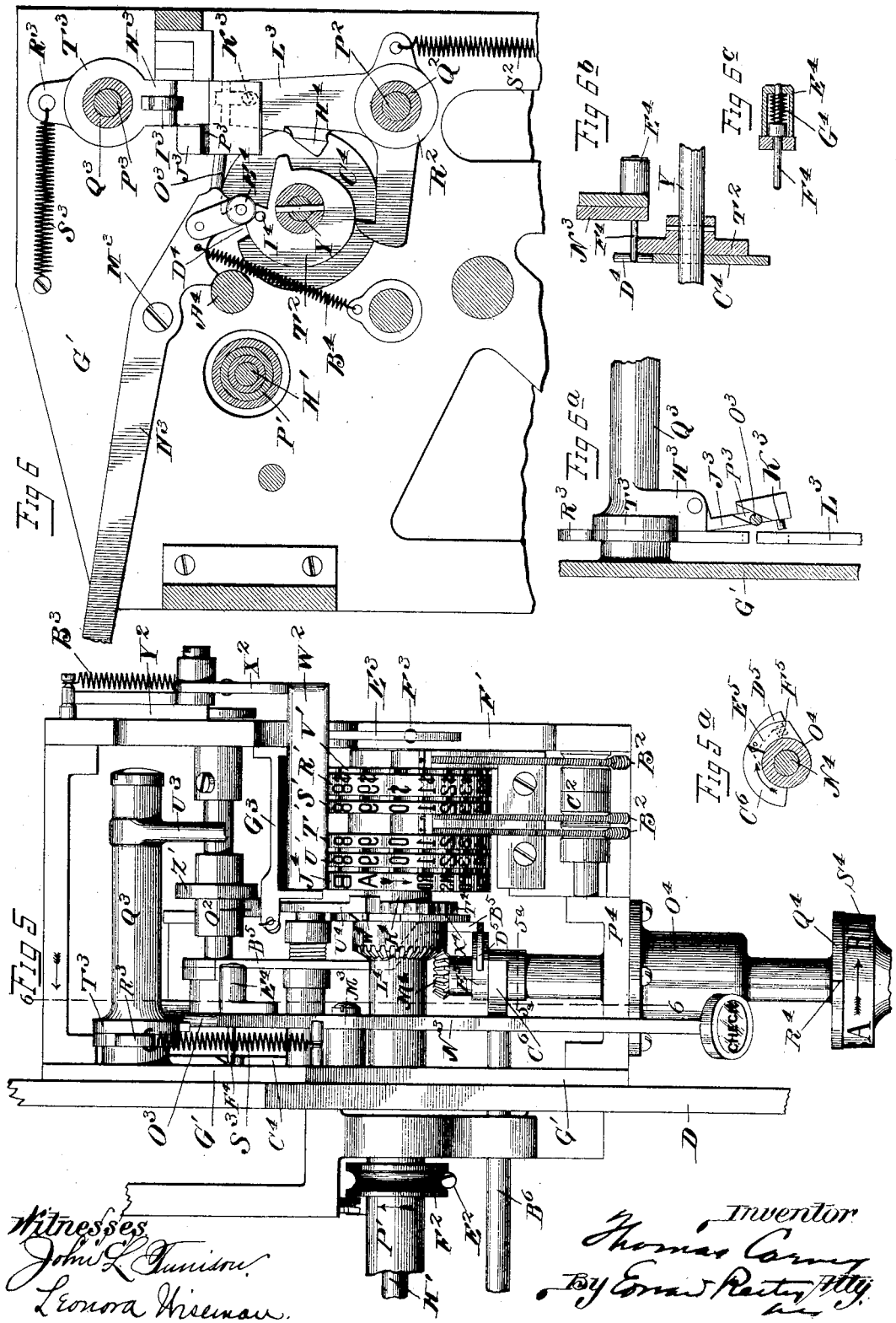

(No Model.) 6 Sheets—Sheet 6.
T. CARNEY.
CASH REGISTER AND RECORDER.
No. 588,127. Patented Aug. 17, 1897.
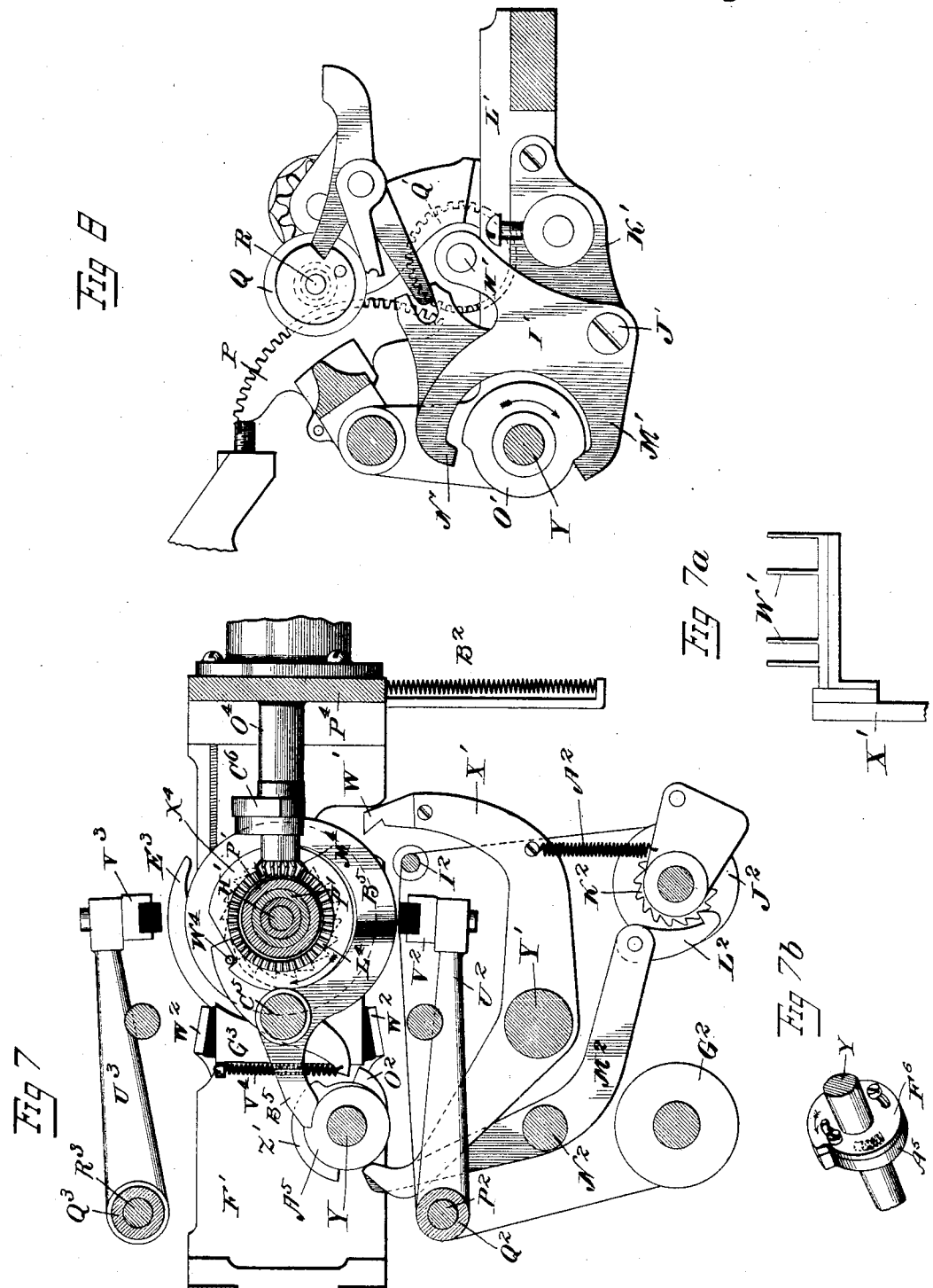

UNITED STATES PATENT OFFICE.

THOMAS CARNEY, OF DAYTON, OHIO, ASSIGNOR TO THE NATIONAL CASH REGISTER COMPANY, OF SAME PLACE.

CASH REGISTER AND RECORDER.

SPECIFICATION forming part of Letters Patent No. 588,127, dated August 17, 1897.

Application filed November 30, 1896. Serial No. 613,933. (No model.)

*To all whom it may concern:*

Be it known that I, THOMAS CARNEY, a citizen of the United States, residing at Dayton, in the county of Montgomery, in the State of Ohio, have invented a certain new and useful Improvement in Cash-Registers, of which the following is a description, reference being had to the accompanying drawings, forming part of this specification.

The first of the two principal features of my present invention relates more particularly to machines in which a series of operating key-levers are employed to actuate both the registering and printing mechanism and in which the normal operation of the machine consists simply in depressing and releasing the front ends of the lever or levers representing the amount of the transaction to be registered and printed. In such machines as heretofore constructed the type-wheels have been set by the downward strokes of the operated key-levers and reset at the upward strokes thereof, moving in unison with the levers. It was therefore necessary to effect the printing either at the very end of the downward strokes of the levers or at the very beginning of their return upward strokes, since the proper type-numbers upon the type-wheels would be at the printing line or lines only at such times. In the ordinary operation of the machines, therefore, in which the key-levers are quickly depressed and released, the type-wheels would be held in printing position but an instant, so that very little time was given for effecting the printing of the amount of the transaction. This difficulty has presented a serious obstacle to the success of machines of this character; and it is the object of the first feature of my present invention to overcome this difficulty. I have accomplished the result by providing means whereby after the type-wheels have been brought to printing position by the downward strokes of the key-levers they are disconnected from the driving or actuating devices of the machine, by which they have been set, and are allowed to remain in set position during a considerable portion of the return strokes of the key-levers, being preferably released and automatically restored to normal position near the end of the operation. In this manner ample time is given for effecting the printing after the type-wheels have been brought to proper position therefor.

The second principal feature of my present invention relates to machines in which provision is made for registering and printing the amounts of all cash sales and also for printing the amounts and preferably the characters of different special classes of transactions, such as credit sales, payments and receipts of money on account, and so on. In some machines a register has been provided for each of such classes of transactions; but the addition of these registers complicates the machine and adds to its expense. It is the object of this feature of my invention to provide means whereby a single register may be employed for registering all cash transactions and whereby the amount of all special transactions may be printed upon the record-strip or ticket, or both, without actuating the registering mechanism, and to this end I have provided means, operated automatically or incidentally by the setting of the type-wheel for printing the character indicating the special class of transactions, whereby the registering mechanism may be thrown out of operation or maintained out of operation while the printing mechanism is actuated to print the amount of such special transaction.

Various other features of my invention relate to novel constructions, arrangements, and combinations of parts, all of which will be hereinafter fully described, and particularly pointed out in the claims.

Figure 2:
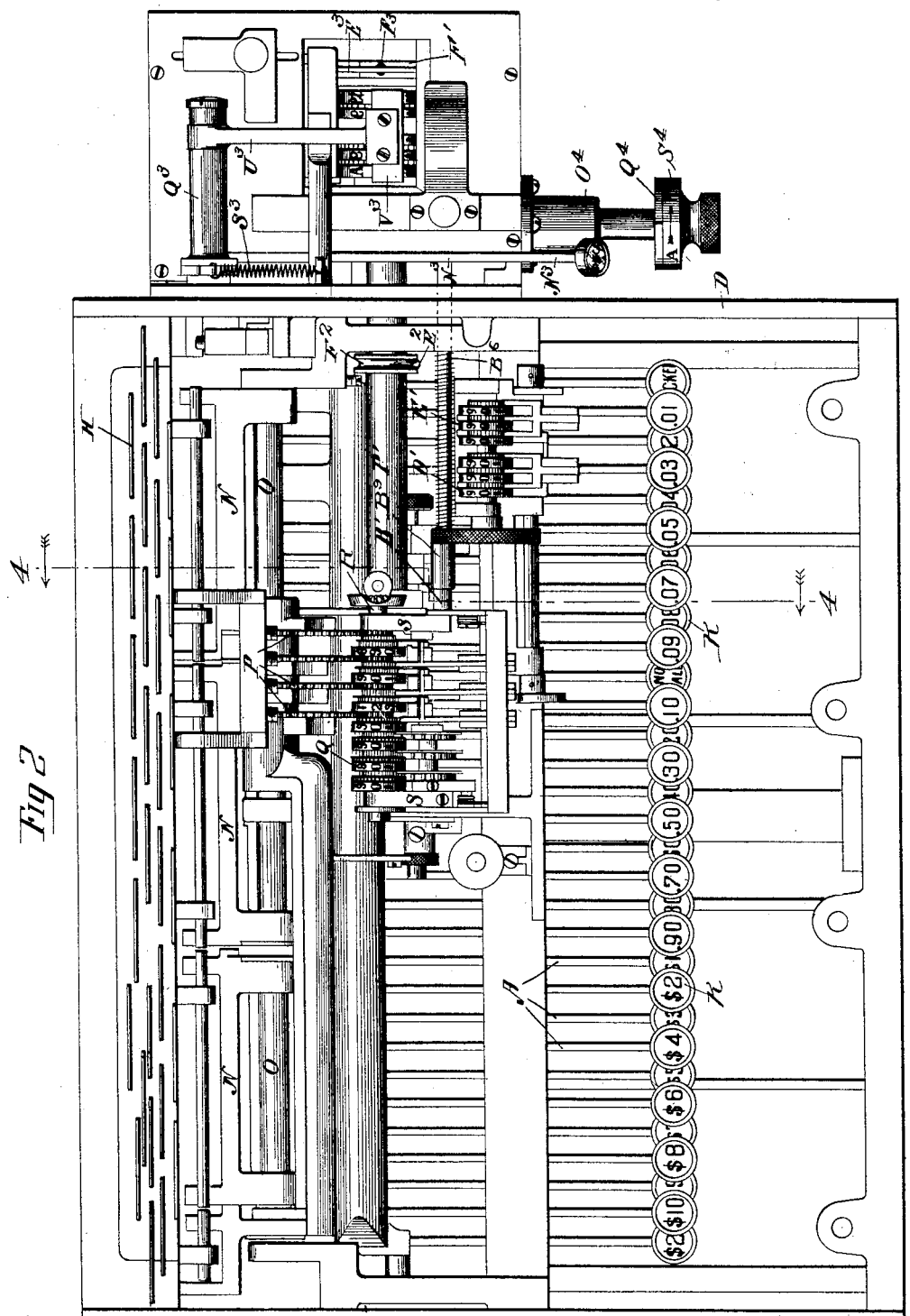
Figure 3:
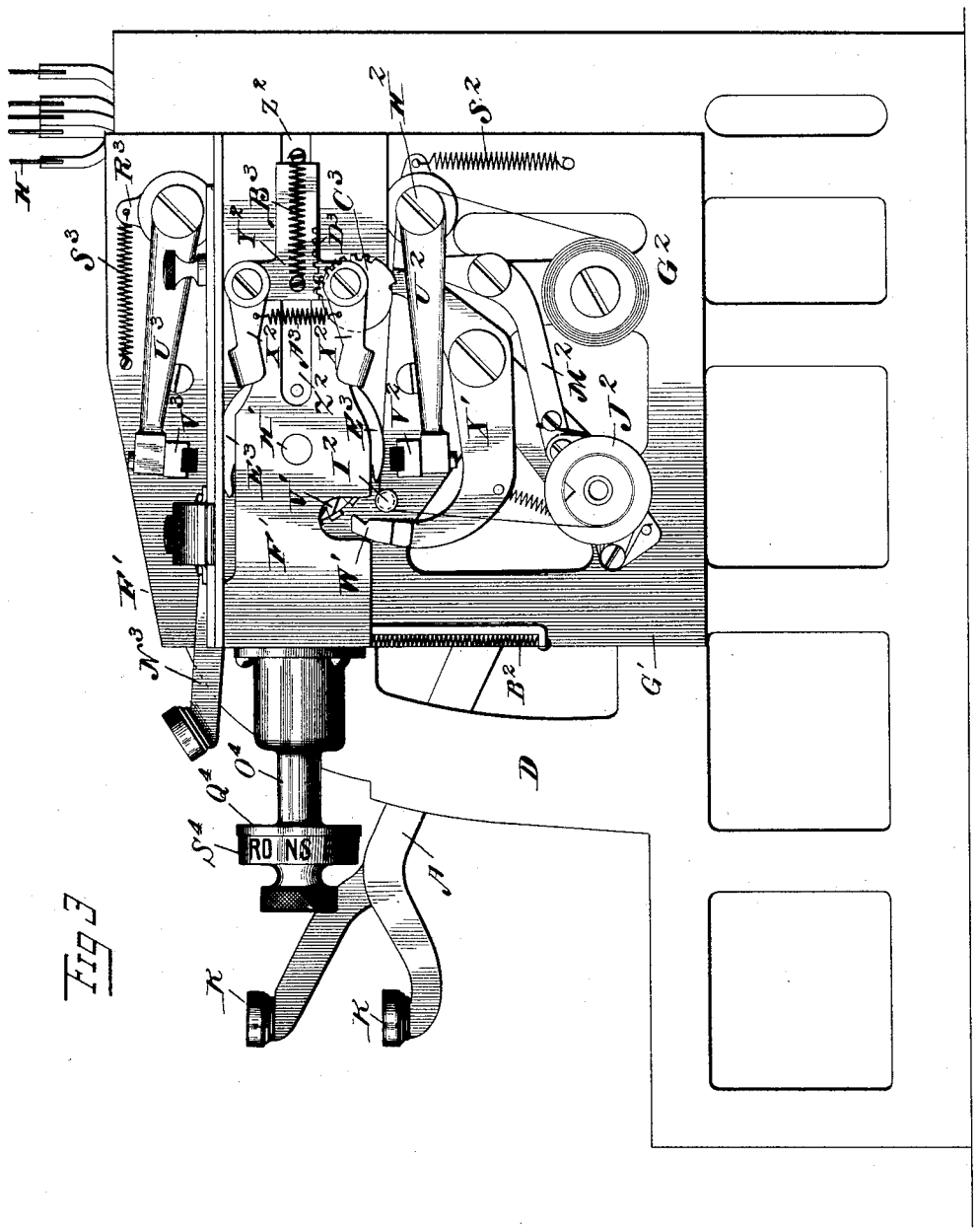

In the accompanying drawings, Figure 1 represents a front elevation of the machine with the front ends of the key-levers cut off; Fig. 2, a top plan view of the machine; Fig. 3, an elevation of the right-hand end thereof; Fig. 4, a vertical section approximately on the line 4 4 of Fig. 2 on an enlarged scale; Fig. 4ª, a detail from Fig. 4, hereinafter explained; Fig. 5, an enlarged top plan view of the printing attachment; Fig. 5ª, a sectional detail on the line 5ª 5ª of Fig. 5; Fig. 6, a vertical section approximately on the line 6 6 of Fig. 5; Figs. 6ª, 6ᵇ, and 6ᶜ, details from Fig. 6, hereinafter explained; Fig. 7, a vertical section approximately on the line 6 6 of Fig. 5, looking toward the right; Fig. 7ª, a detail of the front end of the pawl which coöperates with the ratchets of the type-wheels; Fig. 7ʰ, a detail from Fig. 7, hereinafter referred to; Fig. 8, a detail showing the farther side of the parts occupying the central portion of the view in Fig. 4 and illustrating the means for throwing the type-wheels into and out of gear with the actuating-segments.

The same letters of reference are employed to represent corresponding parts in all the views.

The operating-keys consist of levers A, fulcrumed upon a horizontal rod B, extending transversely through the lower forward part of the machine and mounted at its opposite ends in the side plates C D of the framework, and their rear ends rest in the lower ends of vertical slots in a guide-plate F, secured to the framework, Fig. 4. Resting upon the rear ends of the levers are the usual vertical indicator-rods G, carrying at their upper ends the numbered indicators H and surrounded by spiral resetting-springs I and provided with the collars J, whose rear sides serve as shoulders or projections to operate with the usual supporting bar or wing $J^5$ to temporarily hold the operated indicators exposed to view. The front ends of the levers A are provided with the usual finger-buttons K, Figs. 2 and 3, bearing numbers representing the values of the respective keys. In the present instance the cash-keys, beginning at the right, represent units of cents from one to nine, tens of cents from ten to ninety, units of dollars from one to nine, and ten and twenty dollars, respectively, while in addition there are provided in the present instance two special keys, the one on the extreme right being marked "Ticket" and the one located between the units and tens of cents groups of keys being marked "No sale." Each of the cash-keys has pivoted to it near its rear end a vertical lifter-plate L, Fig. 4, which coöperates with the rod M of the rocking registering-frames N, mounted on the rod O and carrying the gear-toothed segments P for actuating the register-wheels and setting the type-wheels. There is a separate registering-frame N and segment P for each group of keys. Each of the three right-hand frames and segments coöperates with the nine lifters L of its corresponding group of keys, the lifters in each group being so graduated that each will move the registering-frame and segment of such group a distance proportionate to the value of the key by which the lifter is actuated, as described in detail in my prior patents. The ten and twenty dollar keys constitute the fourth group of the series and coöperate with the left-hand registering-frame N and segment P.

The registering-wheels Q, Figs. 1, 2, and 8, are mounted upon a horizontal shaft R, which is journaled at its opposite ends in a rocking frame S, fulcrumed upon a rod T, Fig. 4. This frame is substantially the same as the corresponding frame of my prior machines and is provided with two rearwardly-extending arms U V, giving the end of the frame in Fig. 4 something of a horseshoe or U shape. In my prior machines the rear ends of the arms U and V carried antifriction-rollers coöperating with cams W X, fast upon a rotary shaft Y. In my present machine the arm U carries such a roller coöperating with the cam X, but instead of the arm V coöperating with the cam W there is provided a lever Z, which is fulcrumed upon the end of the rocking registering-frame S at A'. The upper forward end of this lever engages the under side of a rod B', hereinafter described, while its rear end carries the second antifriction-roller, which coöperates with the cam W. As seen in Fig. 8 and as described in my prior patents, the pinions upon the registering-wheels Q are out of mesh when the rocking registering-frame S is in its normal position shown in the drawings, but when the shaft Y is revolved the frame will be rocked by the action of the cams W X and its upper side be thrown slightly rearward and the pinions of the registering-wheels engaged with the segments. The shaft Y, which carries the cams W X, is given a complete revolution at each operation of the machine by suitable devices for the purpose interposed between it and the vibrating frame or cross-bar C', which overlies the key-levers A and is lifted by the operation of any one of them, Fig. 4, which devices in various forms have been illustrated and described in my prior patents and need not be shown or further referred to here. At the beginning of the downward stroke of any key-lever the first forward movement of the cams W X serves to rock the registering-frame S and engage the pinions of the registering-wheels with the segments, so that when the segment corresponding to the operated key begins to move under the action of such key its motion will be transmitted to the corresponding registering-wheel. At the end of the downward stroke of the key-lever and first half of the revolution of the cams W X, or at the very beginning of the backward movement of the key-lever and second half of the revolution of the cams, the rocking registering-frame will be returned to normal position and the pinions of the registering-wheels be disengaged from the segments, so that the operated segment may return to normal position independently of the registering-wheel which has been actuated by it.

In the manner and by the means above described the values of the operated keys are added upon the registering-wheels. The two special keys actuate, respectively, two registers at D' and E', Figs. 1 and 2, to register the number of operations of said keys, as usual.

I will next describe the printing mechanism and the novel features of my machine associated therewith.

Secured to the right-hand end frame D of the machine is a supplemental frame supporting the printing devices, said frame consisting of an outer side plate F', an inner side plate G', secured to the outer side of the main frame-plate D, Fig. 5, and suitable cross-bars and rods connecting them. Journaled at its extreme right-hand end in the outer side plate F', Fig. 3, is a shaft H', which extends to the left through the right-hand half of the machine, Figs. 2, 4, 5, 6, 7, and 8, and at its extreme left hand is journaled in the upwardly and forwardly projecting arm of a rocking plate I', which is fulcrumed at J' upon the side of a fixed plate K', secured to a part L' of the framework of the machine, Fig. 8. The plate I' is provided with two rearwardly-projecting arms M' N', which coöperate with a cam O', fast upon the rotary shaft Y, heretofore described, Fig. 4, with the result that at each operation of the machine the arm M' of the plate I' is depressed at the beginning of the downward movement of the operated key and consequent rotation of the shaft Y and cam O' and the end of the shaft H', carried by the plate I', thereby thrown rearward, the parts remaining in this position during the downward stroke of the operated key and first half of revolution of the shaft Y and cam O'. At the end of such downward stroke of the operated key and beginning of its upward stroke the parts will be returned to normal position by the action of the cam O' upon the upper arm N' of the rocking plate I'. In this manner and by these means the left-hand end of the shaft H' is thrown rearward at the beginning of each operation of the machine and maintained in rearward position until the downward stroke of the operated key is completed and is then returned to its normal forward position.

As seen in Figs. 4 and 7, the shaft H' has mounted upon it three concentric sleeves P', which extend from a point within the rocking registering-frame S to the right through the frame-plates D and G', Fig. 5, and terminate between said plate G' and the outer frame-plate F' of the printing attachment. The right-hand ends of these sleeves P' and the shaft H' have secured to them, respectively, the four cash type-wheels shown in Fig. 5, while at their left-hand ends each of the three sleeves has secured to it a pinion or segment of a pinion Q', the shaft H' also having secured upon it a similar pinion at the left of the pinions carried by the sleeves P'. The pinion carried by the shaft H' stands in line with the left-hand or fourth segment P. The pinion carried by the end of the innermost sleeve stands opposite the third segment P. The one carried by the second sleeve stands opposite the second segment and the one carried by the outermost sleeve opposite the right-hand or first segment. Of the type-wheels shown in Fig. 5 the right-hand wheel R' is fast upon the right-hand end of the shaft H', the second wheel S' upon the end of the innermost sleeve P', the third wheel T' upon the end of the second sleeve P', and the fourth wheel U' upon the outermost sleeve P'. Each of these four wheels, excepting the right-hand wheel R', bears two diametrically opposite series of type-numbers, each representing the nine digits and a cipher. The wheel R' corresponds to the other three wheels, excepting that it has a dollar-mark in place of the ciphers and is wide enough to have additional dollar-marks beside each of the type-numbers upon it.

From the foregoing description it will be understood that at each operation of the machine the left-hand end of the shaft H' will be first thrown rearward and the pinions Q', carried by it, and the sleeves P' be thereby engaged with the segments P, so that the movement of the operated segment or segments will not only be transmitted to the registering-wheels, but to the type-wheels as well, and the adjustment of the parts is such that the downward stroke of any key will serve not only to register its value upon the registering-wheels, but to turn the corresponding type-wheel to position to bring its type-numbers representing the value of such key to the two printing-lines at the upper and lower sides of said wheels, after which the printing is effected in the manner and by the means to be now described, reference being had more particularly to Figs. 3, 5, 6, and 7.

It has before been explained that at the beginning of each operation of the machine the left-hand end of the shaft H' is thrown rearward and maintained in rearward position during the downward stroke of the operated key and is then thrown forward to normal position at the beginning of the upward stroke of such key. It will now be seen that such rearward movements of the shaft H' will carry the pinions Q' into mesh with the respective segments P, so that at the beginning of the downward stroke of any key the pinions will be engaged with the segments and remain engaged therewith during the further stroke of the key and be disengaged therefrom at the end of such downward stroke, so that the segments may return to normal position without the pinions. The adjustment of the parts is such that at the operation of any one of the keys the particular type-wheel corresponding to the group in which such key belongs will be turned during the downward stroke of the key to bring to the printing-lines above and below it its two type-numbers representing the value of such key, after which said type-wheel, being disconnected from the segment P, by which it has been turned in the manner above explained, is held in the position to which it has been turned by the means hereinafter described while the printing is effected, after which the type-wheel is released and returned to normal position by a resetting-spring provided for the purpose.

Each type-wheel is provided upon one side with a ratchet V', Fig. 5, with which coöperates one of the fingers W' of a pawl-lever X', Figs. 7 and 7ª, which is fulcrumed near its middle upon a rod Y', projecting to the right from the frame-plate G', and coöperates at its upper rear end with a cam Z', which is fast upon the rotary shaft Y, heretofore described. As seen in Fig. 7ª, the upper forward end of the lever X carries a series of holding-fingers W', adapted to pass between the several type-wheels and engage the ratchets V'. The cam Z' serves to rock the lever X' and engage the fingers W' with said ratchets immediately after the type-wheels have been set by the downward strokes of the keys in the manner described and holds the fingers in engagement with the ratchets during the continued operation of the machine until nearly the end thereof, whereupon the cam Z' will clear the rear end of the lever X' and release the latter, and the spring $A^2$ will then draw the front end of the lever downward and disengage the fingers W' from the ratchets, permitting the type-wheels to be returned to normal position by their resetting-springs. The resetting-springs $B^2$ for the three right-hand type-wheels are best shown in Figs. 1 and 5, where it will be seen that they are connected at their upper rear ends to lugs upon the hubs of the type-wheels, and pass thence forward over grooved rollers $C^2$, and thence downward in front of a vertical plate $D^2$, secured to the forward side of the supplemental framework, to the lower end of which plate the springs are attached.

The resetting-spring for the left-hand cash type-wheel U' is shown at $E^2$ in Fig. 5, its upper end being connected to a grooved collar $F^2$, fast upon the outer sleeve P', which collar winds up the spring and puts it under tension as it is returned in the direction of the arrow at the setting of its type-wheel.

It will be understood from the foregoing that after the type-wheels have been set by the downward strokes of the operated keys they are disconnected from their actuating devices and are held in set position during a considerable portion of the return strokes of the keys, thereby giving ample time for the printing to be effected in the manner and by the means to be now described.

As seen in Figs. 3 and 7, there is a paper record-strip carried upon a supply-spool $G^2$ and led thence upward over a guide at $Q^2$, thence forward beneath the type-wheels and over a guide-rod $I^2$, and thence downward around a storage-spool $J^2$, the latter of which has fast upon its side a ratchet $K^2$, with which coöperates a pawl $L^2$, carried by the lower forward end of a lever $M^2$, fulcrumed on a rod $N^2$ and coöperating at its upper rear end with a cam $O^2$, by which latter the lever is rocked at each operation of the machine to cause the pawl L to turn the ratchet $K^2$ and draw forward the record-strip. Mounted upon a fixed rod $P^2$, projecting to the right from the frame-plate G', Figs. 6 and 7, is a sleeve $Q^2$, whose inner end, adjacent the frame-plate G', has secured to or formed integral with it a three-armed lever $R^2$, to whose rearwardly-projecting arm is connected a coiled spring $S^2$ and the front end of whose forwardly-projecting arm coöperates with a cam $T^2$, fast upon the rotary shaft Y, heretofore described. At its outer end, Fig. 7, the sleeve $Q^2$ has formed integral with it the horizontal forwardly-extending platen-arm $U^2$, which carries the platen $V^2$, coöperating with the type-wheels at the lower printing-line. The cam $T^2$ is a double one or has two operating projections with an intermediate notch, so that at each operation of the machine and revolution of the cam the forwardly-projecting arm of the lever $A^2$ will be twice depressed and released, thus causing the platen $V^2$ to be thrown toward the type-wheels twice at each operation of the machine. The vertically-extending arm of the lever $R^2$ is adapted to coöperate in the manner hereinafter described with the platen, which effects the printing at the upper side of the type-wheels. The types are inked at the two printing-lines by a pair of inking-strips $W^2$, carried by and projecting to the left from the front ends of a pair of arms $X^2$, Figs. 3, 5, and 7, which are pivoted at their rear ends to the vertically-projecting arms of a three-armed plate $Y^2$, mounted to slide back and forth in a guideway $Z^2$ in the frame-plate F', Fig. 3, substantially as in the machine shown and described in my pending application, Serial No. 568,531. A coiled spring $A^3$ connects the arms $X^2$, while a second coiled spring $B^3$ yieldingly holds the plate $Y^2$ in rearward position. The plate is forced forward at each operation of the machine by a combined segment and cam $C^3$, which is fast upon the outer end of the rotary shaft Y and coöperates with a rack $D^3$ upon the under side of the horizontal arm of the plate $Y^2$. The cam $C^3$ operates to carry the plate $Y^2$ forward during the first half of the operation of the machine, and then releases it and permits the spring $B^3$ to return it to normal position. At the forward movement of the plate $Y^2$ the inking-strips $W^2$ ride over curved plates $E^3$, seated in slots in the upper and lower edges of the frame-plate F', Figs. 3, 5, and 7, being pivoted therein near their rear ends, and toward their front ends resting upon coiled springs $F^3$, seated in holes in said plate. The plates $E^3$ serve to guide the inking-strips over the type-wheels and prevent their rubbing against them, and yet permit the strips to be forced against the type-wheels to ink them. The adjustment of the parts is such that just after the type-wheels have been set in the manner before explained and the inking-strips have been moved forward to position immediately above and below the printing-lines the two platens at the upper and lower sides of the type-wheels are thrown against said strips and force the latter against the types at the printing-lines to ink them, after which the platens are retracted and the inking-strips withdrawn by the spring $B^3$, connected to the plate $Y^2$, and then the platens are thrown toward the type-wheels the second time to effect the printing, all substantially as shown and described in my aforesaid application. The inking-strips rest in normal position upon a saturated ink-pad confined in an ink-fount $G^3$, Figs. 5 and 7, from which they receive ink with which to ink the types.

The platen $V^3$, which coöperates with the type-wheels at their upper sides, is carried by an arm $U^3$, Figs. 3, 4, and 7, which is formed integral with and projects forwardly from a sleeve $Q^3$, which is mounted upon a rod $R^3$, Fig. 6, projecting outward from the frame-plate $G'$. At its inner or left-hand end the sleeve $Q^3$ is provided with a flange $T^3$ and an upwardly-projecting arm $R^3$, to which is connected a coiled spring $S^3$, which tends to pull the arm forward and throw the platen $V^3$ against the type-wheels. Pivoted between ears $H^3$, depending from the under side of the flange $T^3$, is a lug $I^3$, upon the upper edge of a plate $J^3$, Figs. 6 and $6^a$, whose lower end is thus left free to be swung outward and inward to the right and to the left. Projecting from the inner face of this plate $J^3$ near its lower edge is a stud $K^3$, adapted when the plate is swung inward to the left to enter a slot or an elongated hole formed in the upper end of the vertically-extending arm $L^3$ of the three-armed lever $R^2$, Fig. 6, which lever, as before explained, is secured to or forms an integral part of the sleeve $Q^2$, which carries the lower platen-arm $U^2$.

It results from the construction and arrangement of the parts above described that when the pin $K^3$ of the plate $J^3$ is engaged with the hole in the arm $L^3$ the two platen-arms will be so connected that the movements imparted to the lower one by the action of the cam $T^2$ upon the lever $R^2$ will be transmitted to the upper one, with the result that at each operation of the machine the upper platen will be thrown toward the type-wheels twice in succession, once to force the upper inking-strip $W^2$ against the types at the upper printing-line to ink them and then a second time to press against the types any paper strip or ticket inserted beneath the platen to effect the printing. On the other hand, when the plate $J^3$ is swung outward to the right and its pin $K^3$ disengaged from the hole in the arm $L^3$, as in Fig. $6^a$, the two platen-arms and platens will be entirely disconnected, so that the movements imparted to the lower one by the action of the cam $T^2$ will not be transmitted to the upper one and the latter will remain out of action. Now under the particular construction and arrangement shown the plate $J^3$ is normally swung to the right and its pin $K^3$ disengaged from the hole in the arm $L^3$, so that the upper platen is normally inoperative, and for the purpose of engaging the pin $K^3$ with the hole in the arm $L^3$ at will, to place the upper platen in operative condition so that printing at the upper printing-line may be effected at the succeeding operation of the machine, the following devices are employed:

Fulcrumed at $M^3$ upon a stud projecting from the frame-plate $G'$, Figs. 5 and 6, is a lever $N^3$, whose front end projects forward of the printing attachment and is provided with a button or finger-piece, in the present instance bearing the word "Check." The rear end of this lever $N^3$ is formed into a small round rod $O^3$, whose rear end is adapted to coöperate with a cam-slot $P^3$, formed in the forward edge of the swinging plate $J^3$, Fig. $6^a$, the plate $J^3$ being made sufficiently thick for that purpose. When the front end of the lever $N^3$ is depressed and its rear end lifted, the latter, acting against the upper left-hand wall of the cam-slot in the plate $J^3$, will swing said plate toward the left and engage its pin $K^3$ with the hole in the arm $L^3$, and when the front end of the lever is returned to normal position and its rear end thrown downward again the latter will swing the plate $J^3$ to the right and disengage the pin $K^3$ from the hole in the arm $L^3$, as in Fig. $6^a$. Under this construction and arrangement of the parts when it is desired to place the upper platen in operative condition it is only necessary to depress the front end of the lever $N^3$, and by maintaining it depressed during the succeeding operation of the machine the upper platen will be thrown toward the type-wheels twice in succession, as before explained, to ink the types and print their numbers upon any paper strip or ticket inserted beneath the platen. It will be understood that the lever $N^3$ might be returned to normal position when desired by positively lifting its front end, in which event when its front end was once depressed to place the upper platen in operative condition it would remain depressed and the platen remain in operative condition until the front end of the lever was again positively lifted. Where, however, it is desired in the use of the machine to print upon a strip or ticket at the upper printing-line only at considerable intervals, it is preferable that the upper platen shall be automatically thrown out of operative condition at the end of each operation of the machine, so that it will be unnecessary to positively disconnect it from its actuating devices. To this end there is connected to the lever $N^3$ in rear of its fulcrum a coiled spring $B^4$, which yieldingly holds the lever in normal position against a stop $A^4$ with its front end up and its rear end down. When the front end of the lever is depressed and its rear end lifted, this spring is put under tension, so that it will return the lever to normal position as soon as permitted to do so. For the purpose of holding the rear end of the lever in elevated position with the pin $K^3$ of the plate $J^3$ engaged with the hole in the arm $L^3$ during the operation of the machine immediately succeeding the setting of the lever the following means are employed, reference being had to Figs. 5, 6, $6^b$, and $6^c$;

There is secured upon the rotary shaft Y at the inner or left-hand side of the cam T² a circular disk C⁴, which is provided in its upper edge with a recess D⁴. The lever N³ has secured to or formed upon its right-hand side, near its rear end, a tubular housing E⁴, in which fits a pin F⁴, whose left-hand end extends through the lever N³ and on to the left through the recess D⁴ in the disk C⁴, being yieldingly held in this normal position by a spring G⁴, surrounding the pin within its housing E⁴. When the front end of the lever N³ is depressed and its rear end lifted, this pin F⁴ will contact with the rear wall of the recess D⁴ in the disk C⁴ and be forced slightly to the right into its housing, the rear wall of the recess D⁴ being suitably beveled off for the purpose, Fig. 5, and when it clears the upper edge of the disk it will spring back to the left again above the edge of the disk, so that when pressure is removed from the front end of the lever N³ and the spring B⁴ permitted to act to draw the rear end of the lever downward again it will be arrested by the contact of the pin F⁴ with the edge of the disk C⁴. During the succeeding operation of the machine the pin F⁴ will ride upon the periphery of the disk C⁴ as the latter turns with the shaft Y, and as the disk approaches the end of its revolution and brings its recess D⁴ beneath the pin F⁴ the lever N³ will be released and the spring G⁴ permitted to restore it to normal position, the pin F⁴ again entering the recess in the disk.

For the purpose of aiding the action of the springs S² and S³ in throwing the platens against the type-wheels the second time at each operation of the machine the arm L³ is in the present instance provided with a forwardly-projecting lug H⁴, which stands in the path of a stud I⁴, projecting from the side of the cam T² upon the shaft Y, Fig. 6. At each operation of the machine this stud I⁴ will contact with the lug H⁴ just as the second projection upon the cam clears and releases the front end of the lower arm of the lever R², with the result that the arm L³ of said lever will be thrown rearward by the contact of the stud I⁴ with its lug H⁴, as well as by the action of the spring S², so that the printing action of the platens is rendered more certain than if the springs alone were depended upon.

It is often desirable in the use of machines of this character to print upon the paper strip or ticket, or both, a letter or character indicating either the salesman who made the transaction or the character of the transaction or the particular department of the establishment in which the transaction was made in addition to printing the amount of the transaction. For this purpose I have provided a special type-wheel bearing such letters and characters and the following devices coöperating with it: This type-wheel J⁴ is shown in Fig. 5 immediately at the left of the cash type-wheels and is fast upon the right-hand end of a sleeve K⁴, surrounding the sleeves P' and having fast upon its left-hand end a beveled gear L⁴, which meshes with a beveled pinion M⁴, fast upon the rear end of a shaft N⁴, Fig. 5ª, which is mounted in a tubular bearing O⁴, secured to and projecting to the front and rear of the front cross-plate P⁴ of the supplemental frame, which carries the printing attachment. The tubular bearing O⁴ has secured to or formed integral with its front end a disk Q⁴, having an index-mark R⁴ at the middle of its upper side, while the extreme forward end of the shaft N⁴ has secured upon it a circular indicator S⁴, having a milled finger-piece formed on its forward side and bearing upon its periphery a series of letters and characters. In the present instance it bears the four letters "A," "B," "C," and "D," in order from right to left, and the four characters "CH," "PD," "NS," and "RD." The four letters may be used to indicate either four different salesmen or four different departments of a store, while the four characters indicate, respectively, charge or credit sales, money paid out on account, no sale, (any operation of the machine when no sale is made, as when the money-drawer is opened to make change gratuitously,) and money received on account. The type-wheel J⁴ bears in duplicate a corresponding series of type letters and characters, and the adjustment is such that when the indicator S⁴ is turned to the right until any letter or character is brought opposite the index-mark R⁴ on the disk Q⁴ the corresponding letters or characters upon the type-wheel will be brought to the two printing-points. The sleeve K⁴, which carries the type-wheel J⁴, has fast upon it a ratchet T⁴, Fig. 5, with which coöperates the front end of a holding-pawl U⁴, whose rear end has connected to it a coiled spring V⁴, Fig. 7, which presses the front end of the pawl against the ratchet. This ratchet and pawl operate to hold the type-wheel J⁴ in any position to which it may be turned while the printing is being effected, and at the end of the operation of the machine the pawl is tripped by the contact of the cam O² with its rear end, Fig. 7, and the type-wheel and connected parts reset to normal position by the action of a coiled spring (not shown) applied to the shaft N⁴ within the enlarged portion of the tubular bearing O⁴.

For the purpose of preventing the pawl reengaging the ratchet after it has been tripped by the cam O², and before the type-wheel has reached normal position, the pawl carries in a housing in its front end a spring-pressed pin W⁴, Fig. 5, similar to the spring-pressed pin F⁴ carried by the lever N³, which pin when the parts are in normal position fits within a notch or recess in the periphery of a disk X⁴, fastened to the left-hand side of the ratchet T⁴, Figs. 5 and 7. When the sleeve K⁴ and parts carried by it are turned forward to set the type-wheel J⁴, the beveled rear wall of the recess in the disk X⁴ will force the pin W⁴ to the right into its housing in the pawl U⁴, and thereafter the right-hand face of the disk X⁴ will ride over the end of the pin $W^4$ and hold it in such right-hand position. After the type-wheel has been set and the printing effected the cam $O^2$ will contact with the lower rear end of the pawl $U^4$ and throw its forward end upward away from the ratchet $T^4$, which will carry the pin $W^4$ above the upper edge of the disk $X^4$, whereupon the pin will spring outward to the left above the edge of such disk, and when the cam $O^2$ clears the end of the pawl and releases it the pin $W^4$ will rest upon the periphery of the disk during the return of the parts to normal position and hold the pawl out of engagement with the ratchet. As the parts approach normal position the recess will be brought beneath the pin $W^4$ again and the latter will drop into it and the pawl reëngage the ratchet.

From the foregoing description it will be understood that whenever a sale is made by any one of the salesmen "A, B, C, D" or a sale is made from either department of a store represented by one of such letters the amount of the sale may be registered upon the registering mechanism and be also printed upon the paper strip and ticket, together with the letter indicating the salesman who made it or the department of the store from which it was made, so that, in addition to the correct registration of the amounts of all cash sales, an individual record of each of such sales and of the clerk who made it or the department from which it was made may be preserved upon the record-strip and printed upon a separate check or ticket, if desired. So, also, when a credit sale is made or money is received or paid out on account the amount of the transaction and a character indicating what it was may be printed upon the paper strip and ticket; but in such event it will not do to add the amount upon the registering mechanism, since that would confuse it with the cash transactions registered thereon. For the purpose, therefore, of throwing the registering mechanism out of operative condition whenever the machine is to be operated to record any one of the last-mentioned transactions the following devices are provided: Referring to Fig. 4, it has heretofore been explained that at each operation of the machine the cam W acts upon the rear end of the lever Z to rock the register-frame S and throw the registering-wheels rearward into gear with the segments P. It has also been explained that the lever Z is pivoted to the register-frame and that its forward end coöperates with the under side of a rod B', the depression of the rear end of the lever causing its front end to lift the rod B' and thereby rock the frame.

It will be understood that if the rod B' were removed the front end of the lever Z would play idly up and down at each operation of the machine under the action of the cam W and the register-frame remain in normal position with the wheels out of gear with the segments. Now I have provided means for removing the rod B' from the path of the front end of the lever Z whenever the machine is to be operated for the purpose of recording a transaction which is not to be added upon the registering mechanism. To this end the rod B', instead of being fixed in the register-frame S, is mounted to slide longitudinally therein, and, as seen in Fig. $4^a$, is provided upon its under side, immediately at the right of the lever Z, with a notch $A^6$. Abutting against the right-hand end of the rod B' is the left-hand end of a long rod $B^6$, Figs. 1 and 2, which is mounted near its left-hand end in a suitable bearing $B^9$ upon the frame-work and extends at its right-hand end through the end frame-plate D and the frame-plate G' of the printing attachment, Fig. 5, and stands in the path of a cam $C^6$, fast upon the shaft $N^4$, Figs. 5 and 6. A coiled spring surrounding the shaft $B^6$, Fig. 2, presses it toward the right and yieldingly holds it in normal position. A spring (not shown) presses the rod B' toward the right and yieldingly holds it against the left-hand end of the rod $B^6$. It will be seen that when the rod $B^6$ is pressed toward the left it will push the rod B' in that direction and bring its notch $A^6$ into line with the lever Z, so that while the parts are in this position the movement imparted to the lever Z by the cam W will be an idle one and the frame carrying the registering-wheels will remain in normal position and not be rocked rearward to gear the wheels with the segments. It will also be seen that the rod $B^6$ will be forced to the left for this purpose by the cam $C^6$ whenever the shaft $N^4$ is turned far enough to bring any one of the type-characters "CH," "PD," "NS," or "RD" upon the type-wheel $J^4$ to the printing-points, and be held in such left-hand position during the succeeding operation of the machine, so that by operating the proper keys the amount of the transaction and the character of it may be printed without adding it upon the registering mechanism. At the end of the operation and return of the shaft $N^4$ to normal position the spring surrounding the shaft $B^6$ will reset the latter and permit the notch in the rod B' to be carried out of line with the lever Z, so that at the next operation of the machine the amount of the transaction will be added upon the registering mechanism, unless the rod $B^6$ be forced to the left again in the manner described. It is not essential that there should be two separate rods B' and $B^6$, since the rod B' may form a continuation of the rod $B^6$ itself, provided the latter be permitted sufficient play at its left-hand end to accommodate itself to the movements of the frame S when the latter is rocked to gear the registering-wheels with the segments. I prefer, however, to employ a separate rod B', as described, since the register-frame S is made removable and can be removed more readily if the rod $B^6$ is not connected to it.

In prior machines of this class devised by me the special type-wheel has in some instances been set by turning a rotary shaft geared to it, as shown and described in the present instance, while in others it has been set by the operation of special keys corresponding to the different classes of transactions, and it will be readily understood that the novel feature of throwing or maintaining the registering mechanism out of operation by the act of setting the special type-wheel to print a character representing a special class of transaction not to be added upon the registering mechanism may be employed in a machine of this character whether the type-wheel be set in the manner described or be set by the operation of a series of special keys. So far as I am aware I am the first in the art to provide any means whatever by which the setting of the special type-wheel for the purpose described operates to either throw or maintain the registering mechanism out of operation, and this feature of my invention is therefore of corresponding scope.

For the purpose of normally locking the machine from operation and preventing operation of it without first turning the shaft $N^4$ and setting the type-wheel $J^4$ to print some one of its letters or characters the following devices are employed: As seen in Fig. 7, the rotary shaft Y has fast upon it a shouldered disk $A^5$, with which coöperates the rear end of a lever $B^5$, fulcrumed upon a rod $C^5$, and the front end of which is curved around beneath the sleeves upon the shaft $H'$ and bent to the right, so that, as seen in Fig. 5, its extreme forward end projects beneath the right-hand lower end of a plate $D^5$, which, as seen in Figs. 5 and $5^a$, is pivoted in a slot in a plate $E^5$, fast upon the shaft $N^4$. A spring $F^5$ presses the lower end of the plate $D^5$ outward and yieldingly holds it in the normal position shown. When the shaft $N^4$ is turned to the right, the plate $D^5$ will contact with the front end of the lever $B^5$ and depress it and disengage the rear end of the lever from the shouldered disk $A^5$, thereby unlocking the rotary shaft Y and permitting the shaft to be operated. The plate $D^5$ will clear the end of the lever $B^5$ after it has depressed its front end far enough for that purpose, and at the return movement of the shaft the upper right-hand edge of the plate $D^5$ will contact with the end of the lever and the plate will be forced inward into its slot in the plate $E^5$ as it moves upward against the side of the lever, thus permitting the plate to clear the lever without moving the latter.

For the purpose of preventing the rear end of the lever $B^5$ reëngaging the shoulder of the disk $A^5$ before the latter and the shaft Y have been turned forward from normal position, and thereby relocking the machine, the disk $A^5$ has mounted upon its right-hand side a spring-pressed plate $F^6$, provided with a shoulder coincident with the shoulder of the disk, Fig. $7^b$. The rear end of the lever $B^5$ normally engages the shoulders of both the disk $A^5$ and the plate $F^6$, but when it is lifted out of engagement with such shoulders the spring acting upon the plate $F^6$ will project the latter slightly forward and carry its shoulder beneath the end of the lever $B^5$ and prevent the latter dropping back to normal position after the plate $D^5$ has cleared its front end.

While I have described the principal features of my invention as applied to machines in which the several mechanisms of the machine are operated through the medium of the keys or key-levers by power applied to the latter, it will be understood from the description which has been given of them, as well as from the terms of some of my claims, that in their broader scope several of these features are applicable as well to other classes of machines.

Having thus fully described my invention, I claim—

1. In a machine of the character described, in which a type-carrier is moved to different printing positions by the operations of different keys, the combination, with said keys and type-carrier, and suitable means intermediate the same for causing the operations of different keys to move the type-carrier to different printing positions, of means for holding the type-carrier in printing position while permitting the operated key to return to or toward normal position, for the purpose specified.

2. In a machine of the character described, the combination, with a series of keys and a type-carrier, and means intermediate the same for causing the operations of different keys to move the type-carrier to different printing positions, of means for causing said carrier to remain in printing position while the operated key is returned to or toward normal position, and means for thereafter causing said carrier to automatically return to its normal position, for the purpose set forth.

3. In a machine of the character described, the combination, with a series of keys and a type-carrier, and means intermediate the same for causing the operations of different keys to move the carrier to different printing positions, of means for holding the carrier in printing position while permitting the operated key to return to or toward normal position, and means for thereafter automatically releasing the carrier, for the purpose set forth.

4. In a machine of the character described, the combination, with a series of keys and a type-carrier, and means intermediate the same for causing the operations of different keys to move the carrier to different printing positions, of a latch for holding the carrier in printing position while the operated key returns to or toward normal position, a resetting-spring for the carrier, and a trip for the latch.

5. In a machine of the character described, the combination, with a series of keys and a type-carrier, and means intermediate the same for causing the operations of different keys to move the carrier to different printing positions, of a latch for holding the carrier in printing position while the operated key returns to or toward normal position, a resetting-spring for the carrier, and a trip for the latch operating to automatically release the carrier as the operated key approaches normal position.

6. In a machine of the character described, the combination, with a series of keys and a type-carrier, and means intermediate the same for causing the operations of different keys to move the carrier to different printing positions, of a latch, means for throwing said latch into and out of coöperation with the type-carrier, to hold the latter in printing position while the operated key returns toward normal position, and thereafter release it, and a resetting-spring for the type-carrier.

7. In a machine of the character described, the combination, with a series of keys and a type-carrier, and means intermediate the same for causing the operations of different keys to move the carrier to different printing positions, of a latch, a rotary cam coöperating with the latch to throw it into and out of coöperation with the type-carrier, for the purpose specified, and means for resetting the type-carrier when the latch is disconnected from it by the cam.

8. In a machine of the character described, the combination, with a series of keys and a type-carrier, and means intermediate the same for causing the operations of different keys to move the carrier to different printing positions, of a latch, a rotary cam and a spring coöperating with said latch, one for throwing the latch into coöperation with the type-carrier for the purpose specified, and the other for throwing it out of coöperation therewith, and means for resetting the type-carrier when the latch is disconnected from it.

9. In a machine of the character described, the combination, with a series of keys and a type-carrier, and means intermediate the same for causing the operations of different keys to move the carrier to different printing positions, of a latch, a rotary cam acting to throw the latch into coöperation with the type-carrier when the latter has been set to printing position by the operated key, and operating to hold the latch in coöperation with the type-carrier during a substantial part of the return movement of the operated key to normal position, for the purpose set forth.

10. In a machine of the character described, the combination, with a series of keys and a type-carrier, and means intermediate the same for causing the operations of different keys to move the carrier to different printing positions, of a latch, a spring for yieldingly holding the latch out of coöperation with the type-carrier, a rotary cam acting to throw the latch into coöperation with the type-carrier when the latter has been moved to printing position by the operated key, and operating to hold the latch in such coöperation with the type-carrier during a substantial part of the return of the operated key to normal position, and a resetting-spring for the type-carrier.

11. The combination of a series of keys, a movable member common thereto and moved different degrees by the operations of different keys, a type-carrier coöperating with said movable member and moving therewith to different printing positions at the operations of different keys, and means for disconnecting said movable member and type-carrier after the latter has been moved to printing position by the operation of a key, to permit it to remain in such position while the key and movable member return toward normal position.

12. The combination of a series of keys, a movable member common thereto and moved different degrees by the operations of different keys, a type-carrier coöperating therewith and moved to different positions at the operations of different keys, means for disconnecting the movable member and type-carrier after the latter has been moved to printing position by the operation of a key, means for holding it in printing position while the key returns toward normal position, and means for thereafter returning the type-carrier to its normal position, for the purpose set forth.

13. The combination of a series of keys, a movable member common thereto and moved different degrees by the operations of different keys, a type-carrier coöperating therewith and moving to different printing positions at the operations of different keys, means for disconnecting said movable member and type-carrier when the latter has been set to printing position by the operation of a key, a latch, and means for throwing the latch into and out of coöperation with the type-carrier, to hold it in printing position while the operated key and movable member return toward normal position, and for thereafter releasing it to permit it to return to normal position.

14. The combination of a series of keys, a movable member common thereto and moved different degrees by the operations of different keys, a type-carrier coöperating therewith and moving to different printing positions at the operations of different keys, means for disconnecting said movable member and type-carrier when the latter has been set to printing position by the operation of a key, a latch for holding the type-carrier in printing position while the operated key and movable member return toward normal position, a trip for the latch, and a resetting-spring for the type-carrier.

15. The combination of a plurality of sets or series of keys, a plurality of movable members, one common to each set of keys and moved different degrees by the operations of different keys in such set, a plurality of type-carriers, one coöperating with each movable member and moving therewith to different printing positions at the operations of different keys, and means for disconnecting said movable members and type-carriers when the latter have been moved to printing position by the operations of the keys, to permit the type-carriers to remain in printing position while the operated keys and movable members return toward normal position.

16. The combination of a plurality of sets or series of keys, a plurality of movable members, one common to each set of keys and moved different degrees by the operations of different keys in such set, a plurality of type-carriers, one coöperating with each movable member and moving therewith to different printing positions at the operations of different keys, means for disconnecting said movable members and type-carriers when the latter have been moved to printing position by the operations of the keys, means for holding the type-carriers in such position while the operated keys and movable members return toward normal position, and for thereafter returning the type-carriers to their normal position.

17. The combination of a plurality of sets or series of keys, a plurality of movable members, one common to each set of keys and moved different degrees by the operations of different keys in such set, a plurality of type-carriers, one coöperating with each movable member, and moving therewith to different printing positions at the operations of different keys, means for disconnecting said movable members and type-carriers when the latter have been moved to printing position by the operations of the keys, latches coöperating with the type-carriers to hold them in such position while the operated keys and movable members return toward normal position, and springs for returning the type-carriers to normal position when released by the latches.

18. The combination of a plurality of sets or series of keys, a plurality of movable members, one common to each set of keys and moved different degrees by the operations of different keys in such set, a plurality of type-carriers, one coöperating with each movable member, and moving therewith to different printing positions at the operations of different keys, means for disconnecting said movable members and type-carriers when the latter have been moved to printing position by operations of the keys, latches coöperating with the type-carriers to hold them in such position while the operated keys and movable members return toward normal position, resetting-springs for the type-carriers, and a trip for the latches operating to automatically release the type-carriers as the operated keys approach normal position.

19. In a machine of the character described, employing a series of keys representing different amounts adapted to be printed upon a paper strip or ticket, the combination of an oscillatory gear or segment which is moved in one direction to different positions at different operations of the machine, proportionate to the different amounts represented by the several keys, a type-carrier geared to said segment during its movement in such direction, and means for ungearing said segments and type-carrier at the end of such movement of the segment at any given operation of the machine, to permit the segment to return toward normal position while the type-carrier remains in printing position, whereby after the type-carrier has been set to printing position by the segment it may remain at rest while the printing is being effected.

20. In a machine of the character described, the combination of an oscillatory segment which is moved in one direction to different positions at different operations of the machine, proportionate to the different amounts represented by the several keys, a type-carrier geared to said segment, and a rotary cam operating to ungear them at the end of the movement of the segment in such direction, to permit the type-carrier to remain in printing position while the segment returns toward its normal position.

21. In a machine of the character described, the combination of an oscillatory segment which is moved in one direction to different positions at different operations of the machine, proportionate to the different amounts represented by the several keys, a type-carrier geared to said segment, during its movement in such direction, means for ungearing it from the segment at the end of such movement of the latter, means for holding the type-carrier in the position to which it has been moved by the segment, while the latter returns toward normal position, and means for thereafter returning the type-carrier to its normal position.

22. In a machine of the character described, the combination of an oscillatory segment which is moved in one direction to different positions at different operations of the machine, proportionate to the different amounts represented by the several keys, a type-carrier geared to said segment during its movement in such direction, means for ungearing it from the segment at the end of such movement of the latter, a latch for holding the type-carrier in the position to which it has been moved by the segment, a resetting-spring for the type-carrier, and a trip for the latch.

23. The combination of a plurality of oscillatory segments movable in one direction to different positions, a plurality of type-carriers geared to said segments during the movements of the latter in such direction, and means for ungearing the type-carriers and segments at the end of such movements of the latter, for the purpose of permitting the type-carriers to remain in the positions to which they have been moved by the segments, while the latter return toward normal position.

24. The combination of a plurality of oscillatory segments movable in one direction to different positions, a plurality of type-carriers geared to said segments during the movements of the latter in such direction, means for ungearing the type-carriers and segments at the end of such movements of the latter, means for holding the type-carriers in their moved positions while the segments return toward normal position, and for thereafter releasing them, and means for then returning them to their normal position.

25. The combination of a plurality of oscillatory segments movable in one direction to different positions, a plurality of type-carriers geared to said segments during the movements of the latter in such direction, means for ungearing the type-carriers and segments at the end of such movements of the latter, latches for holding the type-carriers in the positions to which they have been moved by the segments, resetting-springs for the carriers, and trips for the latches.

26. The combination of the oscillatory segments P, the shaft H′ mounted in a movable support at one end, the sleeves P′ mounted upon said shaft, the pinions Q′ fast upon the sleeves P′ at one end and the type wheels or carriers fast upon or moving with said sleeves at their opposite ends, and means for moving the shaft H′ to throw the pinions Q′ into and out of gear with the segments P.

27. The combination of the oscillatory segments P′, the shaft H′ mounted at one end of the rocking frame I′, the sleeves P′ mounted upon said shaft, the pinions Q′ fast upon said sleeves at one end and the type-carriers fast upon them at their opposite ends $m$ and the rotary cam O′ coöperating with the frame $l'$ to throw the pinions Q′ into and out of gear with the segments P.

28. The combination of the oscillatory segments P, the shaft H′ mounted at one end in a movable support, as I′, the sleeves P′ mounted upon said shaft, the pinions Q′ fast upon said sleeves at one end and the type-carriers turning with said sleeves at their opposite ends, means, as the rotary cam O′, for rocking the support I′ to throw the pinions Q′ into and out of gear with the segments P, means for holding the sleeves P′ and type-carriers in the positions to which they are turned by the segments P, while the latter return toward normal position, and means for thereafter returning said sleeves and type-carriers to their normal positions.

29. The combination of the oscillatory segments P, the shaft H′ mounted at one end in a movable support, as I′, the sleeves P′ mounted upon said shaft, the pinions Q′ fast upon said sleeves at one end and the type-carriers turning with said sleeves at their opposite ends, means, as the rotary cam O′, for rocking the support I′ to throw the pinions Q′ into and out of gear with the segments P, springs coöperating with the sleeves and type-carriers to yieldingly hold them in and return them to normal position, latches for holding them in the positions to which they are turned by the segments P, while the latter return toward normal position, and a trip for the latches.

30. In a machine of the character described, the combination, with a series of keys and an oscillatory segment, and means intermediate the same for causing the operations of different keys to move the segment different degrees, of a type-carrier geared to said segment, and means for ungearing the type-carrier and segment when the latter has been given its movement by the operation of any key, to permit the type-carrier to remain in moved position while the segment and operated key return toward normal position.

31. In a machine of the character described, the combination, with a series of keys and an oscillatory segment, and means intermediate the same for causing the segment to be moved different degrees by the operations of different keys, of a type-carrier geared to said segment, means for ungearing the type-carrier and segment when the latter has been given its movement by the operation of any key, means for holding the type-carrier in its moved position while the segment and operated key return toward normal position, and means for thereafter returning the type-carrier to its normal position.

32. In a machine of the character described, the combination, with a series of keys and an oscillatory segment, and means intermediate the same for causing the segment to be moved different degrees by the operations of different keys, of a type-carrier geared to said segment, means for ungearing the type-carrier and segment when the latter has been given its movement by the operation of any key, a latch for holding the type-carrier in its moved position while the segment and operated key return toward normal position, a resetting-spring for the type-carrier, and a trip for the latch.

33. The combination of a plurality of sets or series of keys, a plurality of oscillatory segments, one for each set of keys, with means intermediate the same and the keys for causing the operations of different keys in the set to move the segment different degrees, a plurality of type-carriers corresponding to the several segments and carried by or moving with a plurality of concentric sleeves adapted to be thrown into and out of gear with the respective segments, and means for throwing said sleeves out of gear with the segments after the latter have been given their movements by the operated keys, to permit the type-carriers to remain at rest while the segments and operated keys return toward normal position.

34. The combination of a plurality of sets or series of keys, a plurality of oscillatory segments, one for each set of keys, with means intermediate the same and the keys for causing the operations of different keys in the set to move the segments different degrees, a plurality of type-carriers corresponding to the several segments and carried by or moving with a plurality of concentric sleeves mounted upon a shaft movably supported at one end, pinions upon the respective sleeves adjacent the several segments, and means for moving the end of the aforesaid shaft to throw the pinions into and out of gear with the segments, for the purpose set forth.

35. The combination of a plurality of sets or series of keys, a plurality of oscillatory segments, one for each set of keys, with means intermediate the same and the keys for causing the operations of different keys in the set to move the segments different degrees, a plurality of type-carriers corresponding to the several segments and carried by or moving with a plurality of concentric sleeves mounted upon a shaft supported at one end in a movable frame, and a rotary cam for moving said frame to throw the pinions into and out of gear with the segments, for the purpose described.

36. The combination of a plurality of sets or series of keys, a plurality of oscillatory segments one for each set of keys, with means intermediate the same and the keys for causing the operations of different keys in the set to move the segments different degrees, a shaft mounted at one end in a movable support, a plurality of concentric sleeves mounted upon said shaft, a plurality of pinions carried by said sleeves adjacent the segments and a plurality of type-carriers carried by or turning with the opposite ends of said sleeves, means for moving the end of said shaft to throw the pinions into and out of gear with the segments, means for holding the sleeves and type-carriers in the positions to which they are moved by the segments, while the latter return toward normal position, and means for thereafter returning the type-carriers and sleeves to their normal positions.

37. The combination of a plurality of sets or series of keys, a plurality of oscillatory segments one for each set of keys, with means intermediate the same and the keys for causing the operations of different keys in the set to move the segments different degrees, a shaft mounted at one end in a movable support, a plurality of concentric sleeves mounted upon said shaft, a plurality of pinions carried by said sleeves adjacent the segments and a plurality of type-carriers carried by or turning with the opposite ends of said sleeves, means for moving the end of said shaft to throw the pinions into and out of gear with the segments, latches for holding the sleeves and type-carriers in the positions to which they are moved by the segments, springs for returning the type-carriers and sleeves to normal position, and trips for the latches.

38. The combination of a plurality of sets or series of key-levers A, a plurality of segments P, one for each set of keys, and each carried by or moving with a rocking frame N, a plurality of sets of graduated lifters L intermediate the several sets of key-levers A and the several rocking frames N, the shaft H' mounted at one end in a movable support I', the concentric sleeves P' mounted upon said shaft, the pinions Q' fast upon said sleeves adjacent the segments P and the type-wheels fast upon the opposite ends of said sleeves, and the rotary cam O' for rocking the support I', to throw the pinions Q' into and out of gear with the segments P, for the purpose set forth.

39. The combination of a plurality of sets or series of key-levers A, a plurality of segments P, one for each set of keys and each carried by or moving with a rocking frame N, a plurality of sets of graduated lifters L intermediate the several sets of key-levers A and the several rocking frames N, the shaft H' mounted at one end in a movable support I', the concentric sleeves P' mounted upon said shaft, the pinions Q' fast upon said sleeves adjacent the segments P and the type-wheels fast upon the opposite ends of said sleeves, the rotary cam O' for rocking the support I', to throw the pinions Q' into and out of gear with the segments P, the latch-lever X' carrying the latches or fingers W' coöperating with the ratchets V' of the type-wheels, the rotary cam Z' coöperating with the lever X', and the springs for resetting the type-wheels and sleeves.

40. In a machine for registering the amounts of certain classes of transactions, such as cash sales, and for printing upon a paper strip or ticket the amounts of transactions of other classes, the combination, with the registering mechanism and the printing mechanism, of means for throwing the registering mechanism out of operation when it is desired to print the amount of a transaction which is not to be registered upon the registering mechanism.

41. In a machine for registering the amounts of transactions of a given class, such as cash sales, and for printing upon a paper strip or ticket the amounts of other special transactions, the combination, with the registering and printing mechanisms, of a special type-carrier for printing characters indicating the special classes of transactions, and means for setting said type-carrier and throwing or maintaining the registering mechanism out of operation, whereby when said type-carrier is set to print a character representing a special transaction, and the machine is then operated, the amount of such transaction may be printed by the printing mechanism but not added upon the registering mechanism.

42. In a machine for registering the amounts of transactions of a given class, such as cash sales, and for recording the amounts of other transactions as well as cash sales, the combination with the registering mechanism and the printing mechanism, of a special type-carrier for printing characters representing the special classes of transactions, and means for setting said character for that purpose and simultaneously or by the same operation throwing or maintaining the registering mechanism out of operation, for the purpose described.

43. In a machine for registering the amounts of transactions of a given class, such as cash sales, and for recording the amounts of other transactions as well as cash sales, the combination with the registering mechanism and the printing mechanism, of a special type-carrier for printing characters representing the special classes of transactions, setting devices for moving said special type-carrier to position to print a character representing one or another of the special classes of transactions, and means actuated by or coöperating with such setting devices to prevent operation of the registering mechanism at the succeeding operation of the machine, for the purpose described.

44. In a machine for registering the amounts of transactions of a given class, such as cash sales, and for recording the amounts of such transactions and also the amounts of other special classes of transactions, the combination, with the operating mechanism or actuating devices of the machine, of a register normally actuated thereby to register the amount of each transaction, printing devices also actuated thereby to print the amounts of all transactions of all classes, and means for throwing or maintaining the registering mechanism out of operation at will, whenever a transaction is to be recorded but not added upon the registering mechanism.

45. In a machine for registering the amounts of transactions of a given class, such as cash sales, and for recording the amounts of such transactions and also the amounts of other special classes of transactions, the combination, with the operating mechanism or actuating devices of the machine, of a register normally actuated thereby to register the amount of each transaction, printing devices also actuated thereby to print the amounts of all transactions of all classes, a separate type-carrier for printing characters representing different classes of transactions, setting devices for moving said type-carrier to position to print a character representing one or another of the special transactions not to be added upon the registering mechanism, and means coöperating with said setting devices to prevent operation of the registering mechanism at the operation of the machine succeeding such setting of the special type-carrier, for the purpose described.

46. In a machine for registering the amounts of transactions of a given class, such as cash sales, and for recording the amounts of such transactions and also the amounts of other special classes of transactions, of a special type-carrier bearing two sets of type-characters, the one representing different clerks, or departments, of a store, and adapted to print a character in connection with the printing of the amount of each transaction added upon the registering mechanism to show by whom or in what department such transaction was made, and the other set of type-characters representing the different classes of transactions which are not to be added upon the registering mechanism, setting devices for said type-carrier, for moving it to position to print any one of its characters in either set, and means coöperating with said setting devices to prevent operation of the registering mechanism whenever such setting devices are operated to move the special type-carrier to position to print a character representing one of the special classes of transactions not to be added upon the registering mechanism.

47. In a machine of the character described, for recording the amounts of transactions of various classes, but registering the amounts of only one class, the combination, with the driving or operating mechanism of the machine, of a register mounted in a movable frame, and means for moving or maintaining said register out of connection with the driving mechanism at will, when the machine is operated to record a transaction which is not to be added upon the register.

48. In a machine of the character described, for recording the amounts of transactions of various classes, but registering the amounts of only one class, the combination, with the driving or operating mechanism of the machine, of a register mounted in a movable frame adapted to be moved back and forth at each operation of the machine to connect the register with and disconnect it from the driving mechanism, and means for preventing such movement of the frame at any given operation of the machine, when it is desired to record a transaction which is not to be added upon the register.

49. In a machine of the character described, for recording the amounts of transactions of various classes, but registering the amounts of only one class, the combination, with the driving or operating mechanism of the machine, of a register mounted in a movable frame adapted to be moved back and forth at each operation of the machine to connect the register with and disconnect it from the driving mechanism, a rotary cam coöperating with said frame to give it such movements at each operation of the machine, and means for disconnecting the cam and frame at will to prevent the frame being moved by the cam when it is desired that the register shall not be actuated at any given operation.

50. In a machine of the character described, for recording the amounts of transactions of various classes, but registering the amounts of only one class, the combination, with the driving or operating mechanism of the machine, of a register mounted in a movable frame adapted to be moved back and forth at each operation of the machine to connect the register with and disconnect it from the driving mechanism, a rotary cam, a lever actuated thereby and coöperating with a projection on the movable frame to rock the latter and throw the register into gear with the driving mechanism, and means for moving such projection out of the path of the lever at will, to prevent the frame being moved by the cam when it is desired that the register shall not be actuated at any given operation.

51. The combination of the oscillatory segments P, the rocking register-frame S carrying the registering-wheels Q adapted to be thrown into and out of gear with the segments P, the rotary cam W, the lever Z actuated thereby, and the movable member B' carried by the frame S and movable into and out of the path of the lever Z, for the purpose described.

52. The combination of the oscillatory segments P, the rocking register-frame S carrying the registering-wheels Q adapted to be thrown into and out of gear with the segments P, the rotary cam W, the lever Z actuated thereby and coöperating with a movable member B' carried by the frame S, the type-wheels actuated by the segments P, the special type-wheel $J^4$, and means for setting said special type-wheel and moving the member B' out of the path of the lever Z, for the purpose described.

53. The combination of the oscillatory segments P, the rocking register-frame S carrying the registering-wheels Q adapted to be thrown into and out of gear with the segments P, the rotary cam W, the lever Z actuated thereby and coöperating with a movable member B' carried by the frame S, the type-wheels actuated by the segments P, the special type-wheel $J^4$, setting devices for said type-wheel, and means intermediate said devices and the movable member B' of the frame S for moving the member B' out of the path of the lever Z by or in connection with the operation of setting the special type-wheel, for the purpose described.

54. The combination of the oscillatory segments P, the rocking register-frame S carrying the registering-wheels Q adapted to be thrown into and out of gear with the segments P, the rotary cam W, the lever Z actuated thereby and coöperating with a movable member B' carried by the frame S, the type-wheels actuated by the segments P, the special type-wheel $J^4$, the setting-shaft $N^4$ geared to the wheel $J^4$, a projection upon said shaft, and a rod $B^6$ intermediate said projection and the movable member B' of the frame S, whereby when the shaft $N^4$ is turned to set the type-wheel $J^4$ the rod $B^6$ is moved by its projection to carry the member B' out of the path of the lever Z, for the purpose described.

55. The combination of the oscillatory segments P, the rocking register-frame S carrying the registering-wheels Q adapted to be thrown into and out of gear with the segments P, the rotary cam W, the lever Z carried by the frame S, the type-wheels actuated by the segments P, the special type-wheel $J^4$, the setting-shaft $N^4$ geared to the wheel $J^4$, the spring-pressed plate $D^5$ mounted upon the shaft $N^4$, and the rod $B^6$ coöperating in the manner described with the plate $D^5$ and with the movable member B' of the frame S, for the purpose set forth.

56. The combination of the type-wheels provided with duplicate series of type-numbers, the two platens coöperating therewith at the opposite printing-points, operating devices coöperating directly with one platen, a connection between the two platens for causing the movements of the directly-actuated one to be transmitted to the other, and the lever $N^3$ controlling such connection between the platens, whereby one of the platens may be thrown into or out of operation at will by manipulating said lever.

57. The combination of the type-wheels provided with the duplicate series of type-numbers, the platens carried by the arms $U^2$ $U^3$ and coöperating with the type-wheels at the opposite printing-points, the springs acting upon the two platen-arms, the arm or lever $H^3$ moving with the platen-arm $U^3$ and the arm or lever $L^3$ moving with the arm $U^2$, the swinging piece $J^3$ carried by the arm $H^3$ and provided with the pin $K^3$ coöperating with the arm $L^3$, the lever $N^3$ coöperating with the swinging piece $J^3$ to control the engagement of its pin $K^3$ with the arm $L^3$, and the rotary cam $F^2$ coöperating with the arm or lever $L^3$, for the purpose described.

58. The combination of the arms or levers $H^3$ and $L^3$, the swinging piece $J^3$ carried by the arm $H^3$ and provided with the cam-slot $P^3$ and with the pin $K^3$ coöperating with the arm $L^3$, and the lever $N^3$ provided with the pin $O^3$ coöperating with the slot $P^3$ in the swinging piece $J^3$.

59. The combination of the arms or levers $H^3$ and $L^3$, the swinging piece $J^3$ carried by the arm $H^3$ and provided with the cam-slot $P^3$ and with the pin $K^3$ coöperating with the arm $L^3$, the lever $N^3$ provided with the pin $O^3$ coöperating with the slot $P^3$ in the swinging piece $J^3$, the rotary disk $C^4$ provided with the notch or recess $D^4$, and the spring-pressed pin $F^4$ carried by the lever $N^3$ and coöperating with the disk $C^4$ and its notch $D^4$ in the manner described.

60. The combination of a rotary disk, as $C^4$, provided with a notch or recess $D^4$, and a reciprocating member, as $N^3$, carrying a spring-pressed pin $F^4$ coöperating with the disk $C^4$ and its notch $D^4$ in the manner described.

61. The combination of a rotary disk, as $C^4$, having a notch $D^4$ provided with a beveled wall or edge, a reciprocating member, as $N^3$, having a housing $E^4$ containing a spring $G^4$ and a projected pin $F^4$ pressed upon by the spring and coöperating with the disk $C^4$ and its notch $D^4$ in the manner described.

62. The combination of a ratchet, as $T^4$, a disk $X^4$ turning therewith and provided with a notch in its periphery, and a latch or holding-pawl $U^4$ coöperating with the ratchet and provided with a projection $W^4$ coöperating with the disk $X^4$ and its notch in the manner described.

THOMAS CARNEY.

Witnesses:
   JOSEPH P. CLEAL,
   IRA BERKSTRESSER.